(12) United States Patent
Rempel et al.

(10) Patent No.: US 8,314,188 B2
(45) Date of Patent: Nov. 20, 2012

(54) PROCESS FOR THE CONTINUOUS HYDROGENATION OF CARBON-CARBON DOUBLE BONDS IN AN UNSATURATED POLYMER TO PRODUCE A HYDROGENATED POLYMER

(75) Inventors: Garry Rempel, Waterloo (CA); Qinmin Pan, Waterloo (CA); Lifeng Zhang, Vancouver (CA)

(73) Assignee: LANXESS Deutschland GmbH, Leverkusen (DE)

( * ) Notice: Subject to any disclaimer, the term of this patent is extended or adjusted under 35 U.S.C. 154(b) by 268 days.

(21) Appl. No.: 12/506,510

(22) Filed: Jul. 21, 2009

(65) Prior Publication Data

US 2010/0093931 A1  Apr. 15, 2010

(30) Foreign Application Priority Data

Jul. 24, 2008 (EP) ..................... 08161101

(51) Int. Cl.
*C08F 36/00* (2006.01)
*C08F 236/00* (2006.01)
*C08F 136/08* (2006.01)
*B01J 19/18* (2006.01)

(52) U.S. Cl. ............... 525/331.9; 525/329.3; 525/333.1; 422/135

(58) Field of Classification Search ............ 525/52, 525/331.9, 333.1, 333.2, 329.3, 330.3; 422/135
See application file for complete search history.

(56) References Cited

U.S. PATENT DOCUMENTS

| | | | | |
|---|---|---|---|---|
| 3,700,637 A | 10/1972 | Finch, Jr. | .................... | 260/83.3 |
| 4,275,012 A | 6/1981 | Kokubo et al. | .............. | 260/421 |
| 4,370,470 A * | 1/1983 | Vidaurri et al. | .............. | 528/388 |
| 4,464,515 A | 8/1984 | Rempel et al. | ............... | 525/338 |
| 4,503,196 A | 3/1985 | Rempel et al. | ............... | 525/338 |
| 4,581,417 A | 4/1986 | Buding et al. | ................ | 525/338 |
| 4,631,315 A | 12/1986 | Buding et al. | ................ | 525/338 |
| 4,746,707 A | 5/1988 | Fiedler et al. | ................ | 525/338 |
| 4,795,788 A | 1/1989 | Himmler et al. | .............. | 525/338 |
| 4,978,771 A | 12/1990 | Fiedler et al. | ................ | 558/459 |
| 5,378,767 A | 1/1995 | Massie | ......................... | 525/339 |
| 6,080,372 A | 6/2000 | Machado | ...................... | 422/190 |
| 6,307,624 B1 | 10/2001 | Bruck et al. | .................. | 356/301 |
| 6,395,841 B1 | 5/2002 | Calverley et al. | ............. | 525/335 |
| 2004/0059059 A1 | 3/2004 | Heisler et al. | ................. | 525/100 |
| 2007/0055018 A1 | 3/2007 | Achten et al. | ................. | 525/192 |

FOREIGN PATENT DOCUMENTS

| | | |
|---|---|---|
| DE | 25 39 132 | 3/1977 |
| EP | 0 298 386 | 10/1954 |
| EP | 1 862 477 | 12/2007 |
| EP | 1862477 | * 12/2007 |
| WO | 2004/029103 | 4/2004 |

OTHER PUBLICATIONS

Garry Rempel, Catalytic hydrogenation of Nitrile Butadiene Rubber, 2000, Polymer preprints, 14(2), 1507-1508.*
Polymer Preprints (2000) 41, 2, pp. 1507-1508; Rempel, Garry; "Catalytic Hydrogenation of Nitrile Butadiene Rubber".
European Search Report dated Sep. 29, 2009.

* cited by examiner

*Primary Examiner* — Ling Choi
*Assistant Examiner* — Monique Peets
(74) *Attorney, Agent, or Firm* — Jennifer R. Seng

(57) ABSTRACT

Proposed is a process for the continuous hydrogenation of carbon-carbon double bonds in an unsaturated polymer to produce a hydrogenated polymer, said unsaturated polymer being based on a conjugated diolefin and at least one other copolymerizable monomer, in the presence of a homogeneous or heterogeneous catalyst, wherein said unsaturated polymer, hydrogen and said homogeneous or heterogeneous catalyst is passed through a multistage agitated reactor, comprising a cylindrical, elongated shell having closed ends and separated by baffles into a multiplicity of discrete chambers with access from one chamber to another through concentric circular openings, axially centered with said baffles and a continuous rotatable shaft extending concentric with said baffles within said shell with at least one impeller attached thereto positioned in each chamber, said continuous rotatable shaft and said circular openings providing annular openings and said hydrogenated polymer being withdrawn at the opposite end of the multistage agitated reactor at which the feed is introduced.

39 Claims, 1 Drawing Sheet

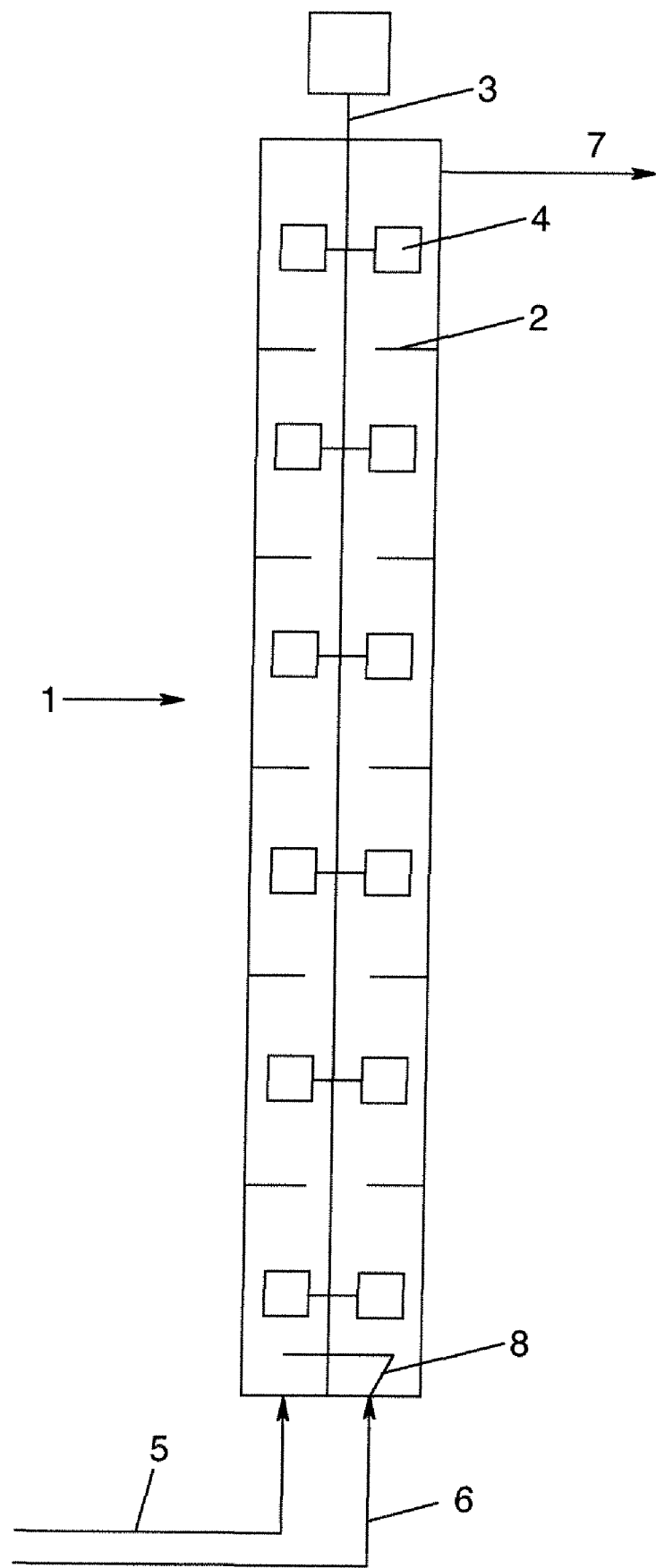

PROCESS FOR THE CONTINUOUS HYDROGENATION OF CARBON-CARBON DOUBLE BONDS IN AN UNSATURATED POLYMER TO PRODUCE A HYDROGENATED POLYMER

FIELD OF THE INVENTION

The invention is directed to a process for the continuous hydrogenation of carbon-carbon double bonds in an unsaturated polymer with hydrogen to produce a hydrogenated polymer, said unsaturated polymer being based on a conjugated diolefin and at least one other copolymerizable monomer, in the presence of a solvent and a catalyst, preferably a homogeneous catalyst.

BACKGROUND OF THE INVENTION

The residual unsaturated bonds in polymer backbones are susceptible to breakdown when exposed to heat, light or ozone. By hydrogenating these unsaturated bonds, the performance of the material with respect to resistance to heat and ozone can be significantly improved, as well as its durability over long term exposure to aggressive environments.

The process of hydrogenation of unsaturated polymers could be operated in a batch or a continuous manner. It has been known that the batch processes are sometimes expensive, lengthy (a process cycle consists of polymer and catalyst preparation, the setting of reaction conditions, the actual reaction time, followed by the cooling and depressurization of the reactors and the removal of the product) and labour-intensive, and are only suitable for the production of small quantities. Product consistency is difficult to attain. When used for large production volumes, the batch process would require a very large reaction apparatus and very long cycle time. In contrast, when a continuous process is adopted, a large quantity of product can be obtained with consistent qualities and a reactor of a smaller size can be utilized. In addition, the integration of mass balance and heat balance can be realized through a continuous process.

Historically, a continuous process for the hydrogenation of unsaturated polymers generally was carried out in fixed bed reactors, wherein the reactors were packed with various types of heterogeneous catalysts.

U.S. Pat. No. 6,395,841 discloses a continuous process for the hydrogenation of unsaturated aromatic polymers in a fixed bed reactor using a group VIII metal as catalyst. However, a relatively high gas flow rate/polymer solution flow rate ratio (at least 150, vol/vol), was used. The high flow ratio ensured enough hydrogen transfer from hydrogen gas phase to liquid phase. However, the excess of hydrogen gas has to be recycled by a compressor, leading to an increase in operation cost. Furthermore, because of the presence of the packing in the fixed bed reactor, the ratio of the reactor space that can be used for reaction is low.

U.S. Pat. No. 5,378,767 discloses a method of hydrogenating unsaturated polymers with low molecular weight which may contain functional groups such as hydroxyl in a fixed bed wherein the reactor is packed with platinum, palladium or a mixture of the two catalysts supported on an alpha alumina support. This process may not be suited to handle high molecular weight polymers.

U.S. Pat. No. 6,080,372 discloses a continuous stirred tank reactor paired with a bubble column reactor to enhance conversion in a continuous hydrogenation process. Raney nickel catalyst was used to hydrogenate glucose to sorbitol and a reasonably high hydrogenation degree (over 90%) can be achieved. However, the use of a bubble column requires an excess amount of hydrogen to mix gas and liquid and provide sufficient gas-liquid contact.

A multistage agitated contactor (MAC) has been recognized to have many advantages over traditional single stage agitated contactors and bubble column reactors. Only a few applications of MACs as gas liquid contactors have been reported. However, most of the applications are focused on air-water systems at ambient conditions. Regarding the use of a MAC for industrial applications in a continuous manner, very few cases have been reported. U.S. Pat. No. 4,275,012 by Kokubo et al. disclosed its use for the continuous process of refining oils and fats. U.S. Pat. No. 4,370,470 by Vidaurri et al. disclosed its use for the continuous production of arylene sulphide polymer in a MAC. However, only a liquid phase reaction was involved and a gas phase reactant was not involved in the above mentioned processes.

In the prior art, it can be seen that only fixed bed reactors have been employed for the continuous process for hydrogenation of unsaturated polymers, particularly, using heterogeneous catalysts. However, some valuable polymers are obtained by using more efficient and highly selective homogeneous catalysts. For example, Rempel, G. L., 2000, Catalytic Hydrogenation of Nitrile Butadiene Rubber, Polymer Preprints, 41(2), 1507 reported several effective catalysts for selective hydrogenation of nitrile butadiene rubber, including rhodium, ruthenium and osmium catalysts. However, these homogeneous catalyst systems are conducted in batch processes.

When fixed bed reactors are applied to perform the continuous process, it is not economical due to the low applicable reactor volume ratio and high pressure drop. If a single continuous stirred tank reactor (CSTR) is considered, an extremely large reactor is needed for a long reaction time since a high hydrogenation degree (95%) is usually required for the production of the final polymer. A continuous process for polymer hydrogenation has some special requirements such as instantaneous mixing of the catalyst at the inlet, exothermic peak mitigation and backflow prevention between the two stages; therefore, the existing MACs mentioned above are not applicable for polymer hydrogenation.

SUMMARY OF THE INVENTION

Accordingly, it is the objective of the present invention to provide a process suitable for continuous hydrogenation of unsaturated polymers, wherein the hydrogenation rate is high, steady stable performance is achieved and a flexible operation is possible.

This objective is achieved by a process for the continuous hydrogenation of carbon-carbon double bonds in an unsaturated polymer to produce a hydrogenated polymer, said unsaturated polymer being based on a conjugated diolefin and at least one other copolymerizable monomer, in the presence of a catalyst, preferably a homogeneous catalyst, wherein said unsaturated polymer, hydrogen and said catalyst are passed through a multistage agitated reactor.

BRIEF DESCRIPTION OF THE DRAWING

FIG. 1 shows an example of the multistage agitated reactor.

DETAILED DESCRIPTION OF THE INVENTION

In one embodiment of the invention the process is performed using a multistage agitated reactor comprising a cylindrical, elongated shell having closed ends and separated by baffles into a multiplicity of discrete chambers with access from one chamber to another through concentric circular openings, axially centered within said baffles and one or two continuous rotatable shafts extending concentric with said baffles within said shell with at least one impeller attached thereto positioned in each chamber, and said hydrogenated polymer is withdrawn at the opposite end of the multistage agitated reactor at which the feed is introduced.

In a preferred embodiment of the invention the process is performed with said multistage agitated reactor in which the aforementioned continuous rotatable shaft and said circular openings provide annular openings The present invention provides a continuous reactor for efficiently hydrogenating unsaturated polymers. The reactor has a high length to diameter ratio and can sustain high pressure having a thinner wall compared to a CSTR. Mechanical agitation in each stage provides superior mass transfer as well as heat transfer since the hydrogenation reactions are usually exothermic. This reactor can be operated at a low hydrogen flow rate/polymer solution flow rate ratio. Another advantage associated with the reactor in the present invention is that each stage can be operated at different conditions such as different temperatures with different impellers and even different agitation speeds, depending on the requirements for mixing and mass transfer performance.

The polymers which are hydrogenated according to the present continuous process are polymers which contain carbon-carbon double bonds and which are based on a conjugated diolefin and at least one other copolymerizable monomer.

The conjugated diolefin is preferably one or more substances selected from butadiene, isoprene, piperylene and 2,3-dimethylbutadiene, preferably butadiene and/or isoprene, and most preferably butadiene.

At least one other copolymerizable monomer is preferably one or more substances selected from acrylonitrile, propyl acrylate, butyl acrylate, propyl methacrylate, methacrylonitrile, butyl methacrylate and styrene, and preferably acrylonitrile and styrene.

Further examples of suitable monomers are esters of ethylenically unsaturated mono- or dicarboxylic acids such as acrylic acid, methacrylic acid, maleic acid, fumaric acid, itaconic acid and mesaconic acid with generally $C_1$-$C_{12}$ alkanols, such as methanol, ethanol, n-propanol, isopropanol, 1-butanol, 2-butanol, isobutanol, tert.-butanol, n-hexanol, 2-ethylhexanol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, ter-butyl methacrylate, n-butyl acrylate, 2-ethylhexyl acrylate and tert butyl acrylate.

The hydrogenation of the polymer is preferably undertaken in solution. Especially suitable solvents for the polymer and the hydrogenation process include benzene, toluene, xylene, monochlorobenzene and tetrahydrofuran, with monochlorobenzene and tetrahyrodofuran being preferred and monochlorobenzene being most preferred. The concentration of the unsaturated polymer in the solvent may be from about 1 to about 40 wt.-%, preferably from about 2 to about 20 wt.-%.

The hydrogenation is undertaken in the presence of a homogeneous or heterogeneous catalyst, which preferably is an organo-metallic catalyst, most preferred a rhodium, ruthenium, titanium, osmium, palladium, platinum, cobalt, nickel or iridium either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

In one preferred embodiment the homogeneous catalyst represents an organo-metallic catalyst, preferably a rhodium, ruthenium, osmium, or iridium metal complex catalyst.

Preferred metals for the heterogeneous catalyst are one or more metals selected from platinum, palladium, nickel, copper, rhodium and ruthenium. The heterogeneous catalyst can be preferably supported on carbon, silica, calcium carbonate or barium sulphate.

Preferably, the catalyst is a homogeneous catalyst.

Specially suited are osmium catalysts having the formula $$Os\ QX(CO)(L)(PR_3)_2$$

in which Q may be one of hydrogen and a phenylvinyl group, X may be one of halogen, tetrahydroborate and alkyl- or aryl-carboxylate, L may be one of an oxygen molecule, benzonitrile or no ligand, and R may be one of cyclohexyl, isopropyl, secondary butyl and tertiary butyl said tertiary butyl being present only when one R is methyl, with the proviso that when Q is phenylvinyl X is halogen and L is no ligand and when X is alkyl- or aryl-carboxylate Q is hydrogen and L is no ligand, said halogen being selected from chlorine and bromine. Preferably, Q is hydrogen, X is selected from chlorine, tetrahydroborate and acetate, L is an oxygen molecule or no ligand and R is cyclohexyl or isopropyl. Additional alkyl- or aryl-carboxylates include chloroacetate and benzoate.

Examples of suitable osmium catalysts include $OsHCl(CO)[P(cyclohexyl)_3]_2$, $OsHCl(CO)[P(isopropyl)_3]_2$, $OsHCl(O_2)(CO)[P(cyclohexyl)_3]_2$, $OsHCl(O_2)(CO)[P(isopropyl)_3]_2$, $Os(CH=CH-C_6H_5)\ Cl(CO)[P(cyclohexyl)_3]_2$, $Os(CH=CH-C_6H_5)\ Cl(CO)[P(isopropyl)_3]_2$, $OsH(BH_4)(CO)[P(cyclohexyl)_3]_2$, $OsH(BH_4)\ (CO)[P(isopropyl)_3]_2$, $OsH(CH_3COO)(CO)[P(cyclohexyl)_3]_2$, $OsH(CH_3COO)\ (CO)[P(isopropyl)_3]_2$, $OsHCl(CO)(C_6H_5CN)\ [P(cyclohexyl)_3]_2$, and $OsHCl(CO)\ (C_6H_5CN)\ [P(isopropyl)_3]_2$. Preferred catalysts are $OsHCl\ (CO)\ [P(cyclohexyl)_3]_2$, $OsHCl(CO)\ [P(isopropyl)_3]_2$, $OsHCl(O_2)(CO)\ [P(cyclohexyl)_3]_2$ and $OsHCl\ (O_2)(CO)\ P(isopropyl)_3]_2$.

The quantity of the osmium catalyst required for the hydrogenation process is preferably from about 0.01 to about 1.0 wt.-% based on the unsaturated polymer and most preferably from about 0.02 to about 0.2 wt.-% based on the unsaturated polymer.

The selective hydrogenation can be achieved, for example, in the presence of a rhodium- or ruthenium-containing catalyst. It is possible to use, for example, a catalyst of the general formula $$(R^1{}_mB)_l\ M\ X_n$$

where M is ruthenium or rhodium, the groups $R^1$ are identical or different and are each a $C_1$-$C_8$-alkyl group, a $C_4$-$C_5$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) trichloride and tris (dimethyl sulphoxide)rhodium(III) trichloride and also tetrakis(triphenylphosphine)rhodium hydride of the formula $(C_6H_5)_3P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable. The catalyst may also be used in an amount of from 0.02 to 0.2% by weight.

In one embodiment of the present invention the catalyst can be used together with a co-catalyst. This co-catalyst is preferably a ligand of formula $R_mB$, where R, m and B are as defined above, and m is preferably 3. Preferably B is phosphorus, and the R groups can be the same or different. The R group of the catalyst may be a triaryl, trialkyl, tricycloalkyl, diaryl monoalkyl, dialkyl monoaryl, diaryl monocycloalkyl, dialkyl monocycloalkyl, dicycloalkyl monoaryl or dicycloalkyl monoaryl group. Examples of suitable co-catalyst ligands are given in U.S. Pat. No. 4,631,315, the disclosure of which is incorporated by reference as far as applicable in the respective jurisdiction. The preferred co-catalyst ligand is triphenylphosphine. The co-catalyst ligand is preferably used in an amount in the range 0 to 5000%, more preferably 500 to 3000% by weight, based on the weight of catalyst. Preferably also the weight ratio of the co-catalyst to the rhodium-containing catalyst compound is in the range 0 to 50, more preferably in the range 5 to 30.

In one embodiment of the process according to the present invention the unsaturated polymer, hydrogen and the catalyst are introduced into the first chamber at the bottom of the multistage agitated reactor The catalyst may be introduced into one or more different chambers of the multistage agitated reactor.

The continuous hydrogenation is preferably carried out at a temperature of from about 100° C. to about 260° C., preferably from about 100° C. to 180° C., most preferably from about 120° C. to about 160° C. and at a hydrogen pressure of from about 0.7 to 50 MPa, most preferably from about 3.5 to 10.5 MPa. The continuous hydrogenation is preferably carried out at a temperature in the range of from 100° C. to 260° C., preferably in the range of from 100° C. to 180° C., most preferably from 120° C. to 160° C. and at a hydrogen pressure in the range of from 0.7 to 50 MPa, more preferably in the range of from 3.5 to 10.5 MPa.

The process according to the invention is carried out in a multistage agitated reactor comprising a cylindrical, elongated shell having closed ends and separated by baffles into a multiplicity of discrete chambers with access from one chamber to another through concentric circular openings, axially centred with said baffles and a continuous rotatable shaft extending concentric with said baffles within said shell with at least one impeller means attached thereto positioned in each chamber, with said continuous rotatable shaft and said circular openings providing annular openings.

Baffles are used to separate the whole reactor into multiple chambers (stages). The baffles have central openings, which allow the access of both polymer solution and hydrogen gas. The dimension of the central opening of the baffle is critical, depending on the reactor scale, polymer solution viscosity and flow rate as well as other reaction conditions, etc., and it can significantly affect the process effectiveness although it can vary depending on the maximum back mixing allowed within the reactor. For example, for a reactor with a diameter of less than 20" and with a viscosity of less than 500 cp (corresponding to 0.5 Pas), for a typical polymer hydrogenation system, within a general flow rate range the residence time would be 10 mins to a few hours, the ratio of the diameter of the circular opening to the diameter of the multistage agitated reactor is preferably in the range of from 1:10 to 1:2, further preferably from about 1:8 to 1:4.

In a further embodiment the multistage agitaged reactor contains from 3 to 30, preferably from 6 to 10, baffles, the baffles being circular discs with a central opening, the ratio of the diameter of the central opening to the diameter of the multistage agitated reactor being preferably in the range of from about 1 to 6, further preferable from about 1 to 2.

The baffles can preferably be provided, in addition to the central circular opening, with some perforations therein.

The number of baffles is typically from 1 to 50, preferably from 3 to 30, more preferably from 3 to 20 and most preferably from 6 to 10.

The multistage agitated reactor is typically provided with one or two continuous rotatable shafts, extending in the direction of the length of the reactor, with at least one impeller attached thereto positioned in each chamber. The advantage to use two rotatable shafts is that the impellers on these two shafts could be run at different speeds to meet the need of the different reactor zones. For example, in the inlet zone, mixing, heat transfer and mass transfer are crucial for which higher agitation speed is preferred, and in the exit zone, extremely high agitation consumes high energy but does not give any significant benefit to compromise the consumed energy. When two rotatable shafts are used, the inlet shaft is preferred to be extended from chamber one to three ("chamber" here means the interval between two baffles), more preferably from chamber one to two, and the other shaft is then extended to the remaining chambers.

The impellers should be able to provide excellent mixing in the lateral direction and minimal back mixing in axial directions. Depending on the viscosity of the polymer solution, the impellers could be of various types from paddle type, turbine type, propellant type or helical ribbons. For example, for the polymer solution which has a viscosity of less than 200 cp (0.2 Pas), paddle and turbine types are preferred; the number of blades could be preferably four to twelve. When the viscosity is higher than 5000 cp (5 Pas), helical ribbons or a combination of helical ribbons and propellant impeller are preferred; the ribbon number could be one to four. Furthermore, the impellers along the shaft(s) are not necessarily the same. In the chambers near the inlet, impellers which provide a high shear rate with proper circulation-in-chamber capacity are preferred and in the chambers near the exit, the impellers which provide high circulation-in-chamber capacity with proper shear rate are preferred.

The ratio of the diameter of the at least one impeller to the diameter of the multistage agitated reactor is preferably in the range of from 19:20 to 1:3, depending on the viscosity of the polymer solution. For example, the ratio is preferably from 3:4 to 1:3, further preferably from 1:2 to 1:3. This in particular applies for a system with a viscosity of less than 200 cp (0.2 Pas).

A longer reactor allows a thinner reactor wall under pressure conditions compared to a single CSTR. Therefore, the cost of reactor material can be reduced. The continuous hydrogenation reactor also possesses advantages over a bubble column since an impeller is embedded in each stage. Therefore, superior mass transfer and heat transfer can be obtained. The superior mass transfer permits a lower hydrogen flow rate and greatly reduces the total amount of excess hydrogen required.

The dimension of the reactor could vary according to the requirement for the yield and for the residence time. The absolute residence time depends on the catalyst activity, the catalyst concentration and the hydrogenation degree desired, and the relative residence time is preferably 3 to 6 times of the kinetic reaction time constant.

FIG. 1 illustrates an example of the multistage agitated reactor with a cylindrical, elongated shell (1) having closed ends and separated by baffles (2) into a multiplicity of discrete chambers with access from one chamber to another through concentric circular openings, axially centered with said baffles and a continuous rotatable shaft (3) extending concentric with said baffles within said shell with at least one impeller (4) attached thereto positioned in each chamber. In the exemplary multistage agitated reactor (1) the hydrogenated polymer is withdrawn over a conduit (7) which is located at the opposite end of the multistage agitated reactor to where the feed, i.e. the reactants (5) and hydrogen gas (6) is introduced, wherein the conduit (6) is attached to a gas sparger (8).

The multistage structure can be advantageous for temperature control flexibility as the temperature in each chamber can be controlled separately so that isothermal hydrogenation can be realized.

An advantageous option is that a pre-mixer can be used before the reactor to provide considerable flexibility of the reactor performance. When a pre-mixer is used, the rapid heating and then the instantaneous mixing between the catalyst and polymer solution can be achieved before the MAC which can simplify the design of the MAC. The pre-mixer is preferably a cylinder tank equipped with an agitator having superior mixing performance. The cylinder tank could be disposed vertically or horizontally. The volume of the pre-mixer is preferably between 1% and 100% of the volume of the MAC, depending on the scale of the MAC. For example, when the volume in the scale is larger than 100 L the volume ratio of the pre-mixer and the MAC is preferably less than 20%, and further preferably less than 10%. The ratio of the length and the diameter is preferably from 0.5 to 3.0, more preferably from 0.5 to 1.0 when the pre-mixer is disposed vertically and from 1.0-3.0 when the pre-mixer is horizontally disposed. The pre-mixer can have one or multi-agitators, depending on the volume of the pre-mixer and also the way of the pre-mixer disposal (vertical or horizontal). Preferably, the agitator(s) in the pre-mixer is a high-shear type of agitator, such as a pitched blade agitator or turbines when the pre-mixer is disposed vertically, and turbines or deformed discs when the pre-mixer is horizontally disposed. A deformed disc here is such a disc impeller which is formed by scissor-cutting 12 or 16 lines evenly from the edge toward the center of the disc and the length of the lines is ⅓ to ⅖ of the diameter of the disc and by then twisting each such formed petal by a 30-60 degree in opposite directions for the adjacent petals. The ratio of the agitator diameter and the inner diameter of the pre-mixer is preferably 1/3-19/20, depending on the viscosity and the disposed manner of the pre-mixer. Preferably, for example, when the viscosity is less than 200 cp (0.2 Pas) and the pre-mixer is vertically disposed, the diameter ratio is from 1/3 to 2/3, and when the viscosity is less than 200 cp (0.2 Pas) and the pre-mixer is horizontally disposed, the diameter ratio is larger than 2/3.

The further flexibility of the multistage structure is that a pre-mixer before the MAC can be used or can be eliminated. When a pre-mixer is used, the rapid heating and then the instantaneous mixing between the catalyst and polymer solution can be achieved before the MAC and simplify the design of the MAC and one shaft would suffice; however, in the alternative, the first chamber of the MAC can function as the pre-mixer, and a physically separated pre-mixer can be eliminated. Depending on the scale of the process, for a small scale process, the pre-mixer can be eliminated; however, for a large scale process, the use of a pre-mixer is economically beneficial.

In one embodiment of the process according to the invention the unsaturated polymer and hydrogen are passed via a pre-mixer prior to introducing into the multistage agitated reactor If a pre-mixer is used, the catalyst can be partly or completely introduced via the pre-mixer.

Preferably, heat transfer means are provided to control the temperature in the reactor and the premixer. Such a type of heat transfer means could be a jacket equipped to the MAC and the pre-mixer, in which the heating/cooling medium could be steam or other fluids to designed for heat exchange, or could be a set of coils located inside the reactor or the pre-mixer, or could be an electrical heating system, and also could be the combination of the mentioned means. For a small scale operation (e.g., lab scale), using only one type of heat transfer means is preferred and internal heating/cooling coils are not needed. However, because the hydrogenation operation is highly exothermic, for a medium or large scale operation (e.g., pilot to commercial scale), a combination of several heating/cooling means is preferred and internal heating/cooling coils are required.

In one embodiment a cooling coil is provided in the first chamber of the multistage agitated reactor.

Preferably, heat exchange means are provided to cool down the product mixture drawn off from the multistage agitated reactor.

The disposition of the MAC can be vertical, horizontal or in any angle, preferably vertical.

Hydrogen can be introduced into the reaction system from the pre-mixer or the reactor via a gas sparger, in order to ensure uniform distribution thereof, or from both the pre-mixer and the reactor.

Preferably, the continuous hydrogenation is carried out at a ratio of the hydrogen gas flow rate to the flow rate of the unsaturated polymers from 0.1 to 100, more preferably from 0.5 to 50, and most preferably from 1 to 10.

Preferably, the liquid residence time in the multistage agitated reactor (1) is from 5 min. to 1 hour, more preferably from 10 min. to 40 min., and most preferably from 20 to 40 min.

The direction of hydrogen and polymer solution flow through the multistage agitated reactor may be opposite or the same but a parallel operation manner is preferred. For a vertically or slantwise disposed MAC, the direction of the flow could be upwards or downwards, preferably upwards. Accordingly, the unsaturated polymer, hydrogen and homogeneous catalyst are preferably introduced into the first chamber at the bottom of to the multistage agitated reactor, or the catalyst pre-mixer if a pre-mixer is used.

The present invention relates especially to the hydrogenation of nitrile rubber.

The term nitrile rubber, also referred to as "NBR" for short, refers to rubbers which are copolymers or terpolymers of at least one $\alpha$, $\beta$-unsaturated nitrile, at least one conjugated diene and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Special preference is given to 1,3-butadiene.

As $\alpha,\beta$-unsaturated nitrile, it is possible to use any known $\alpha,\beta$-unsaturated nitrile, preferably a ($C_3$-$C_5$) $\alpha,\beta$-unsaturated nitrile such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the $\alpha,\beta$-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl(meth)acrylate, ethoxyethyl(meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of or of the sum of the conjugated dienes is usually in the range from 40 to 90% by weight, preferably in the range from 55 to 75% by weight, based on the total polymer. The proportion of or of the sum of the α,β-unsaturated nitriles is usually from 10 to 60% by weight, preferably from 25 to 45% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrile rubbers used for the hydrogenation have a Mooney viscosity (ML 1+4 at 100° C.) in the range from 30 to 70, preferably from 30 to 50. This corresponds to a weight average molecular weight $M_w$ in the range 200 000-500 000, preferably in the range 200 000-400 000. The nitrile rubbers used also have a polydispersity $PDI=M_w/M_n$, where is the weight average molecular weight and $M_n$ is the number average molecular weight, in the range 2.0-6.0 and preferably in the range 2.0-4.0.

Hydrogenated nitrile rubber, also referred to as "HNBR" for short, is produced by hydrogenation of nitrile rubber. Accordingly, the C=C double bonds of the copolymerized diene units have been completely or partly hydrogenated in HNBR. The degree of hydrogenation of the copolymerized diene units is usually in the range from 50 to 100%.

Hydrogenated nitrile rubber is a specialty rubber which has very good heat resistance, excellent resistance to ozone and chemicals and also excellent oil resistance.

The above mentioned physical and chemical properties of HNBR are associated with very good mechanical properties, in particular, a high abrasion resistance. For this reason, HNBR has found wide use in a variety of applications. HNBR is used, for example, for seals, hoses, belts and clamping elements in the automobile sector, and also for stators, oil well seals and valve seals in the field of oil extraction and also for numerous parts in the aircraft industry, the electronics industry, mechanical engineering and shipbuilding.

Commercially available HNBR grades usually have a Mooney viscosity (ML 1+4 at 100° C.) in the range from 35 to 105, which corresponds to a weight average molecular weight $M_w$ (method of determination: gel permeation chromatography (GPC) against polystyrene equivalents) in the range from about 100 000 to 500 000. The polydispersity index PDI ($PDI=M_w/M_n$ where $M_w$ is the weight average molecular weight and $M_n$ is the number average molecular weight), which gives information about the width of the molecular weight distribution, measured here is frequently in the range from 2,5 to 4,5. The residual double bond content is usually in the range from 1 to 18%.

The degree of hydrogenation depends on the polymer concentration, the amount of catalyst used, the gas and liquid flow rates and process conditions. The desired hydrogenation degree is from about 80 to about 99.5%, preferably from about 90 to about 99%.

The hydrogenation degree can be determined by using Fourier Transform Infrared (FTIR) or Proton Nuclear Magnetic Resonance (NMR) techniques.

EXAMPLES

The invention is further illustrated by means of examples.
The following examples are set forth to illustrate the scope of the invention but are not intended to limit the same.

Example 1

A multistage agitated cylinder reactor with an inner diameter of 0.06 m consists of six stages, vertically disposed. The height of each stage is equal to the diameter of the reactor. Five horizontal baffles separate the reactor into six stages (chambers) as well as provide a central opening of 5% of the whole cross sectional area. A Rushton turbine with a diameter of 0.03 m is located in the center of each stage as an impeller. The reactor has a jacket which allows heating/cooling medium to go through and steam was used as to the heating medium. The temperature of the reactor was maintained at 130° C. A pipe nozzle with a diameter of 0.001 m was used as a hydrogen sparger. Nitrile butadiene rubber (NBR) (Krynac® 38.5 with 38 wt.-% ACN content and a Mooney viscosity ML 1+4 at 100° C. of 50) dissolved in monochlorobenzene (MCB) is used as an unsaturated polymer with a 2.5 wt.-% concentration. $OsHCl(CO)(O_2)(PC_{y3})_2$ was dissolved in monochlorobenzene under hydrogenation conditions as the catalyst precursor. The prepared Osmium catalyst concentration was 100 μM. The impeller was operated at 600 r.p.m. The system was operated at a pressure of 350 psi (2.41 MPa) by a back pressure regulator. The nitrile butadiene rubber solution was charged into the reactor at a flow rate of 24 ml/min. Hydrogen gas was supplied at a flow rate of 48 ml/min.

After the flow became steady, polymer samples were taken at the exit of the reactor. The hydrogenation degree of nitrile butadiene rubber was determined by FTIR. The resultant polymer has a hydrogenation level of 91%.

Example 2

Example 2 was conducted in the same reactor as described in example 1. The reactor was operated at 140° C. and 500 psig (3.45 MPa) hydrogen. 2.5 wt.-% NBR was dissolved in MCB. The liquid feed rate was 24 ml/min and the gas flow rate was 48 ml/min, and the impeller was operated at 750 rpm.

The same catalyst as in example 1 was used in this example. The osmium catalyst concentration was 80 µM. The resultant polymer had a hydrogenation level of 99.4% at steady state.

Example 3

Example 3 was conducted in the same reactor as described in example 1. The reactor was operated at 140° C. and 350 psig (2.41 MPa) hydrogen. 2.5 wt.-% NBR was dissolved in MCB. The liquid feed rate was 24 ml/min and the gas flow rate was 48 ml/min. The impeller was operated at 750 rpm. The same catalyst was used as in example 1. The osmium catalyst concentration was 27 µM. The resultant polymer had a hydrogenation level of 61% at steady state.

Example 4

Example 4 was conducted in the same reactor as described in example 1. The reactor was operated at 140° C. and 500 psig (3.45 MPa) hydrogen. 5 wt.-% NBR was dissolved in MCB. The liquid feed rate was 24 ml/min and the gas flow rate was 48 ml/min. The impeller was operated at 750 rpm. The same catalyst was used in as in example 1. The osmium catalyst concentration was 140 µM. The resultant polymer had a hydrogenation level of 99% at steady state.

Example 5

Example 5 was conducted in the same reactor as described in example 1. The reactor was operated at 140° C. and 500 psig (3.45 MPa) hydrogen. 2.5 wt.-% NBR was dissolved in MCB. The liquid feed rate was 48 ml/min and the gas flow rate was 48 ml/min. The impeller was operated at 750 rpm. The same catalyst was used as in example 1. The osmium catalyst concentration was 80 µM. The resultant polymer had a hydrogenation level of 85% at steady state.

The above 5 examples demonstrate that the present invention effectively provides hydrogenation of unsaturated polymers and exhibits operation flexibility.

What is claimed is:

1. A process for the continuous hydrogenation of carbon carbon double bonds in an unsaturated polymer based on a conjugated diolefin and at least one other copolymerizable monomer to produce a hydrogenated polymer, in the presence of a solvent and a catalyst, wherein said unsaturated polymer, hydrogen and said catalyst are passed through a multistage agitated reactor,
wherein said multistage agitated reactor comprises a cylindrical, elongated shell having closed ends and separated by baffles into a multiplicity of discrete chambers with access from one chamber to another through concentric circular openings, axially centered with said baffles and one or two continuous rotatable shafts extending concentric with said baffles within said shell with at least one impeller attached thereto positioned in each chamber, said hydrogenated polymer being withdrawn at the opposite end of the multistage agitated reactor at which the feed is introduced.

2. The process according to claim 1, wherein said catalyst is either a homogeneous catalyst or a heterogeneous catalyst.

3. The process according to claim 2, wherein said homogeneous catalyst is an organo-metallic catalyst.

4. The process according to claim 3, wherein said homogeneous catalyst is a rhodium, ruthenium, osmium, or iridium metal complex catalyst.

5. The process according to claim 2, wherein said heterogeneous catalyst comprises one or more of the metals platinum, palladium, nickel, copper, rhodium and ruthenium.

6. The process according to claim 5, wherein said heterogeneous catalyst is supported on carbon, silica, calcium carbonate or barium sulphate.

7. The process according to claim 3, wherein the organometallic catalyst is a rhodium or ruthenium metal complex catalyst having the formula

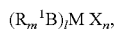

where M is ruthenium or rhodium, the groups $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S=O, X is hydrogen or an anion, l is 2, 3 or 4, m is 2 or 3 and n is 1, 2 or 3.

8. The process according to claim 7, wherein X is halogen.

9. The process according to claim 8, wherein X is chlorine or bromine.

10. The process according to claim 7, wherein the catalyst is selected from the group consisting of tris(triphenyl-phosphine)rhodium(I) chloride, tris(triphenylphosphine)rhodium (III) trichloride, tris(dimethylsulphoxide)rhodium(III) trichloride, tetrakis(triphenylphosphine)-rhodium hydride of the formula $(C_6H_5)_3P)_4RhH$ and the corresponding compounds in which the triphenylphosphine has been completely or partly replaced by tricyclohexylphosphine.

11. The process according to claim 3, wherein the organometallic catalyst is an osmium metal complex catalyst having the formula

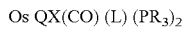

in which Q may be one of hydrogen and a phenylvinyl group, X may be one of halogen, tetrahydroborate and alkyl- or aryl-carboxylate, L may be one of an oxygen molecule, benzonitrile or no ligand, and R may be one of cyclohexyl, isopropyl, secondary butyl and tertiary butyl said tertiary butyl being present only when one R is methyl, with the proviso that when Q is phenylvinyl X is halogen and L is no ligand and when X is alkyl- or aryl-carboxylate Q is hydrogen and L is no ligand, said halogen being selected from chlorine and bromine.

12. The process according to claim 1, wherein a co-catalyst is also present.

13. The process according to claim 12, wherein triphenylphosphine is used as co-catalyst.

14. The process according to claim 1, wherein said unsaturated polymer, hydrogen and said catalyst are introduced into the first chamber at the bottom of the multistage agitated reactor.

15. The process according to claim 1, wherein the catalyst is introduced into one or more different chambers of the multistage agitated reactor.

16. The process according to claim 1, wherein said conjugated diolefin is one or more substances selected from butadiene, isoprene, piperylene and 2,3-dimethylbutadiene.

17. The process according to claim 1, wherein at least one other copolymerizable monomer is one or more substances selected from acrylonitrile, propyl acrylate, butyl acrylate, propyl methacrylate, methacrylonitrile, butyl methacrylate and styrene.

18. The process according to claim 1, wherein the catalyst is introduced in a total quantity of from 0.01 to 1.0 wt.-% based on the unsaturated polymer.

19. The process according to claim 18, wherein the catalyst is introduced in a total quantity of from 0.03 to 0.5 wt.-%, based on the unsaturated polymer.

20. The process according to claim 18, wherein the catalyst is introduced in a total quantity of from 0.1 to 0.3 wt.-% based on the unsaturated polymer.

21. The process according to claim 1, wherein the continuous hydrogenation is carried out in the presence of a hydrocarbon solvent.

22. The process according to claim 21, wherein the continuous hydrogenation is carried out in the presence of a hydrocarbon solvent selected from the group consisting of benzene, toluene, xylene, monochlorobenzene and tetrahydrofuran.

23. The process according to claim 22, wherein the concentration of the unsaturated polymer in the hydrocarbon solvent is from about 1 to about 40 wt.-%.

24. The process according to claim 23, wherein the concentration of the polymer in the hydrocarbon solvent is from about 2 to about 20 wt.-%.

25. The process according to claim 1, wherein the continuous hydrogenation is carried out at a ratio of the hydrogen gas flow rate to the flow rate of the unsaturated polymers of from 0.1 to 100.

26. The process according to claim 25, wherein the continuous hydrogenation is carried out at a ratio of the hydrogen gas flow rate to the flow rate of the unsaturated polymers of from 0.5 to 50.

27. The process according to claim 25, wherein the continuous hydrogenation is carried out at a ratio of the hydrogen gas flow rate to the flow rate of the unsaturated polymers of from 1 to 10.

28. The process according to claim 1, wherein the residence time of the solvent in the multistage agitated reactor is from 5 min. to 1 hour.

29. The process according to claim 28, wherein the residence time of the solvent in the multistage agitated reactor is from 10 min, to 40 min.

30. The process according to claim 1, wherein the continuous hydrogenation is undertaken at a temperature of from about 100° C. to about 260° C.

31. The process according to claim 1, wherein the continuous hydrogenation is carried out at a hydrogen pressure of from about 0.7 to 50 MPa.

32. The process according to claim 1, wherein said unsaturated polymer and hydrogen are passed via a pre-mixer prior to introducing into the multistage agitated reactor.

33. The process according to claim 1, wherein the catalyst is partly or completely introduced via a pre-mixer.

34. The process according to claim 1, wherein hydrogen is introduced via a gas sparger.

35. The process according to claim 1, wherein a cooling coil is provided in the first chamber of the multistage agitated reactor.

36. The process according to claim 1, wherein heat exchange meanings are provided to cool down the product mixture drawn off from the multistage agitated reactor.

37. The process according to claim 1, wherein there are provided from 3 to 30 baffles, the baffles being circular discs with a central opening, the ratio of the diameter of the central opening to the diameter of the multistage agitated reactor being in the range of from about 1 to 6.

38. The process according to claim 37, wherein there are provided from 6 to 10 baffles and the ratio of the diameter of the central opening to the diameter of the multistage agitated reactor being in the range of from about 1 to 2.

39. The process according to claim 1, wherein the ratio of the diameter of the at least one impeller to the diameter of the multistage agitated reactor is in the range of from 3:4 to 1:3.

* * * * *